(12) United States Patent
Zhu (10) Patent No.: US 9,325,401 B2
(45) Date of Patent: Apr. 26, 2016

(54) BEAMFORMING FROM MULTIPLE TRANSMISSION SITES

(75) Inventor: Chenxi Zhu, Fairfax, VA (US)

(73) Assignee: Fujitsu Limited, Kawasaki-shi (JP)

( * ) Notice: Subject to any disclaimer, the term of this patent is extended or adjusted under 35 U.S.C. 154(b) by 678 days.

(21) Appl. No.: 13/425,939

(22) Filed: Mar. 21, 2012

(65) Prior Publication Data

US 2012/0289281 A1 Nov. 15, 2012

Related U.S. Application Data

(60) Provisional application No. 61/486,070, filed on May 13, 2011.

(51) Int. Cl.
| | |
|---|---|
| *H04W 72/02* | (2009.01) |
| *H04B 7/06* | (2006.01) |
| *H04B 7/02* | (2006.01) |
| *H04L 25/02* | (2006.01) |
| *H04L 25/03* | (2006.01) |
| *H04L 5/00* | (2006.01) |

(52) U.S. Cl.
CPC .............. *H04B 7/0639* (2013.01); *H04B 7/024* (2013.01); *H04L 25/0224* (2013.01); *H04L 25/03904* (2013.01); *H04L 25/03955* (2013.01); *H04L 5/0007* (2013.01)

(58) Field of Classification Search
CPC .... H04B 7/0639; H04B 7/024; H04B 7/0452; H04B 7/0456; H04B 7/061; H04B 7/0691; H04L 25/03343; H04L 25/0224; H04L 25/03904; H04L 25/03955; H04L 5/0007
See application file for complete search history.

(56) References Cited

U.S. PATENT DOCUMENTS

| | | | |
|---|---|---|---|
| 2009/0181708 A1 | 7/2009 | Kim et al. | 455/501 |
| 2010/0027456 A1 | 2/2010 | Onggosanusi et al. | 370/312 |
| 2010/0069122 A1* | 3/2010 | Ito | 455/562.1 |
| 2011/0002406 A1 | 1/2011 | Ming et al. | |
| 2012/0082118 A1* | 4/2012 | Long et al. | 370/329 |

FOREIGN PATENT DOCUMENTS

| | | |
|---|---|---|
| CN | 101877684 | 11/2010 |
| CN | 102025457 | 4/2011 |

(Continued)

OTHER PUBLICATIONS

Chinese Office Action issued for Application No. or Patent No. 201210141339.4, Mar. 31, 2014.

(Continued)

*Primary Examiner* — Fanghwa Wang
(74) *Attorney, Agent, or Firm* — Baker Botts L.L.P.

(57) ABSTRACT

According to one embodiment, a method includes selecting a first transmission site from a plurality of transmission sites based on the quality of a first channel between the first transmission site and an endpoint. The method further includes determining a first precoding matrix corresponding to the first transmission site. The first precoding matrix may be applied to data transmitted by the first transmission site to the endpoint. The method further includes determining a second precoding matrix corresponding to a second transmission site of the plurality of transmission sites. The second precoding matrix may be determined based on at least a first spatial direction that is calculated based on at least the first channel.

17 Claims, 3 Drawing Sheets

(56) References Cited

FOREIGN PATENT DOCUMENTS

WO    WO 2011/029458 A1    3/2011
WO    WO 2011/050755         5/2011    ............ H04W 24/00

OTHER PUBLICATIONS

Extended European search report issued by the EPO for Application No./Patent No. 12167722.3-1246/2523363; Reference: P118829EP00/TCS, Dec. 14, 2012.
3GPP TSG RAN #50; Revised SID Proposal: *Coordinated Multi-Point Operation for LTE*; 3GPP™ Work Item Description; RP-101425; 6 pages, Dec. 7, 2010.
ETSI TS 136 211; LTE; Evolved Universal Terrestrial Radio Access (E-UTRA); *Physical Channels and Modulation* (3GPP TS 35.211 Version 10.0.0, Release 10); 105 pages, Jan. 2011.
ETSI TS 136 212; LTE; Evolved Universal Terrestrial Radio Access (E-UTRA); *Multiplexing and Channel Coding* (3GPP TS 36.212 Version 10.0.0, Release 10); 74 pages, Jan. 2011.
ETSI TS 136 213; LTE; Evolved Universal Terrestrial Radio Access (E-UTRA); *Physical Layer Procedures* (3GPP TS 36.213, Version 10.0.1, Release 10); 100 pages, Jan. 2011.
The State Intellectual Property Office of China, 2nd Notification of Office Action, Application No. 201210141339.4 dated Nov. 18, 2014, 16 pages (Chinese/English versions).
European Patent Office, Communication pursuant to Article 94(3) EPC, EPO Application No. 12167722.3-1855, Ref. P118829EP00/TCS, dated May 22, 2015 (5 pages).
Office Action regarding Notice of Reason(s) for Rejection by the Japanese Patent Office for Patent Application No. 2012-105951 and English Translation of an Office Action of Japan Patent Office Mailing Date.

\* cited by examiner

BEAMFORMING FROM MULTIPLE TRANSMISSION SITES

RELATED APPLICATION

This application claims benefit under 35 U.S.C. §119(e) of U.S. Provisional Application Ser. No. 61/486,070, entitled "BEAMFORMING FROM MULTIPLE TRANSMISSION SITES," filed May 13, 2011, the entire content of which is incorporated herein by reference.

TECHNICAL FIELD

The present disclosure relates generally to methods and apparatuses for beamforming from multiple transmission sites.

BACKGROUND

An antenna system may include multiple transmission sites. A transmission site may be a base station (also known as a Radio Element Control or a Baseband Unit) or a remote transmission site (also known as a Radio Element or a Remote Radio Head). Transmission sites provide endpoints with wireless network access. Within an antenna system, the transmission sites are distributed among different locations and are generally connected to each other via wired connections (e.g., optical fiber). An antenna system may implement downlink coordinated multi-point processing (DL CoMP). DL CoMP is a special type of multiple-input and multiple-output (MIMO) transmission where multiple transmitting antennas are placed at different transmission sites, while one or more receiving antennas are located at the endpoint. Transmissions from multiple antenna ports at different locations to the same endpoint using the same physical resource blocks (PRBs) are coordinated by the transmission sites. For example, transmissions from multiple base stations may be coordinated over an X2 interface and transmissions involving remote transmission sites may be coordinated over internal fiber connections between a base station and the remote transmission sites.

SUMMARY OF THE DISCLOSURE

Various embodiments of the present disclosure relate to beamforming from multiple transmission sites. For example, in one embodiment, a method includes selecting a first transmission site from a plurality of transmission sites based on the quality of a first channel between the first transmission site and an endpoint. The method further includes determining a first precoding matrix corresponding to the first transmission site. The first precoding matrix may be applied to data transmitted by the first transmission site to the endpoint. The method further includes determining a second precoding matrix corresponding to a second transmission site of the plurality of transmission sites. The second precoding matrix may be determined based on at least a first spatial direction that is calculated based on at least the first channel.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
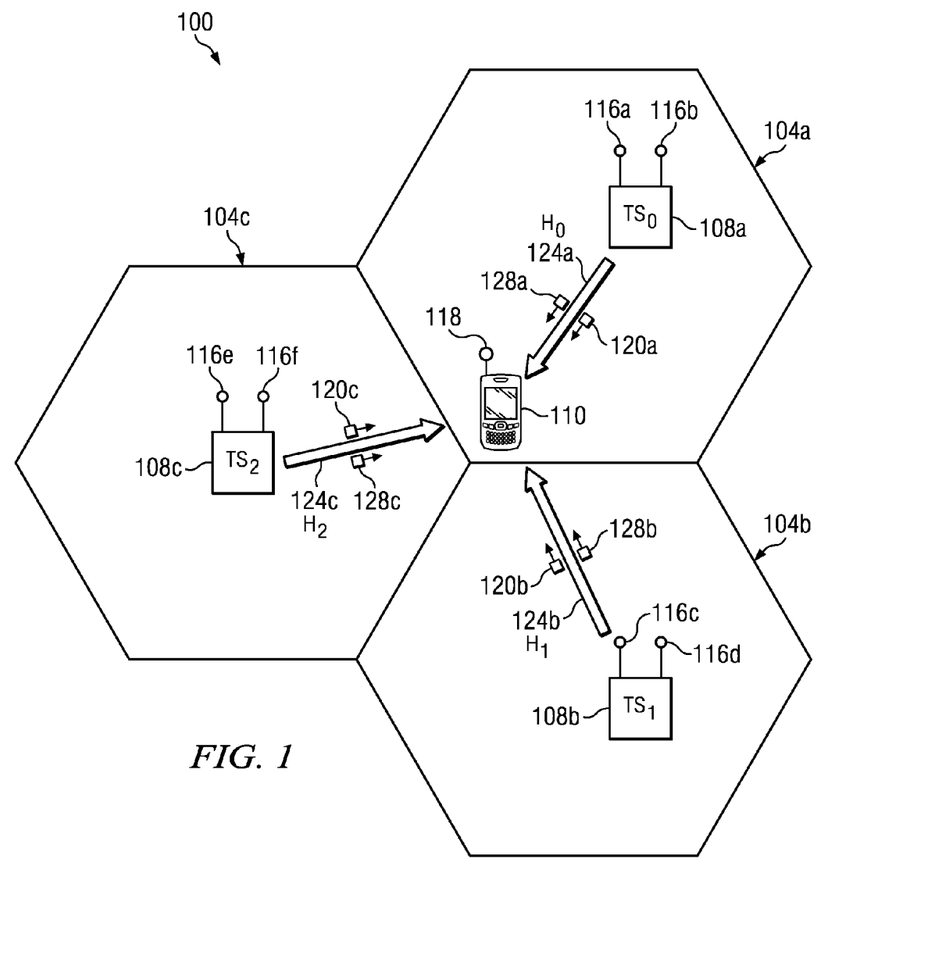
FIG. 1 depicts an example antenna system that performs beamforming from multiple transmission sites.
Figure 2:
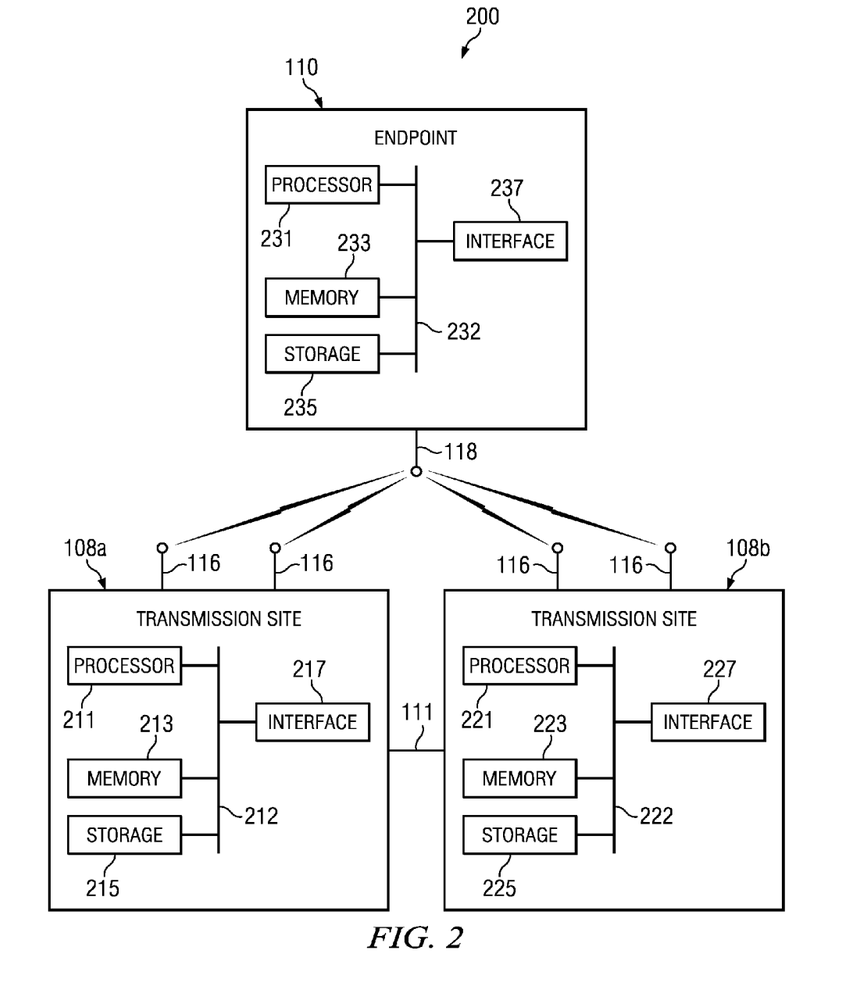
FIG. 2 depicts example computing systems that may facilitate the operations of various components of FIG. 1.
Figure 3:
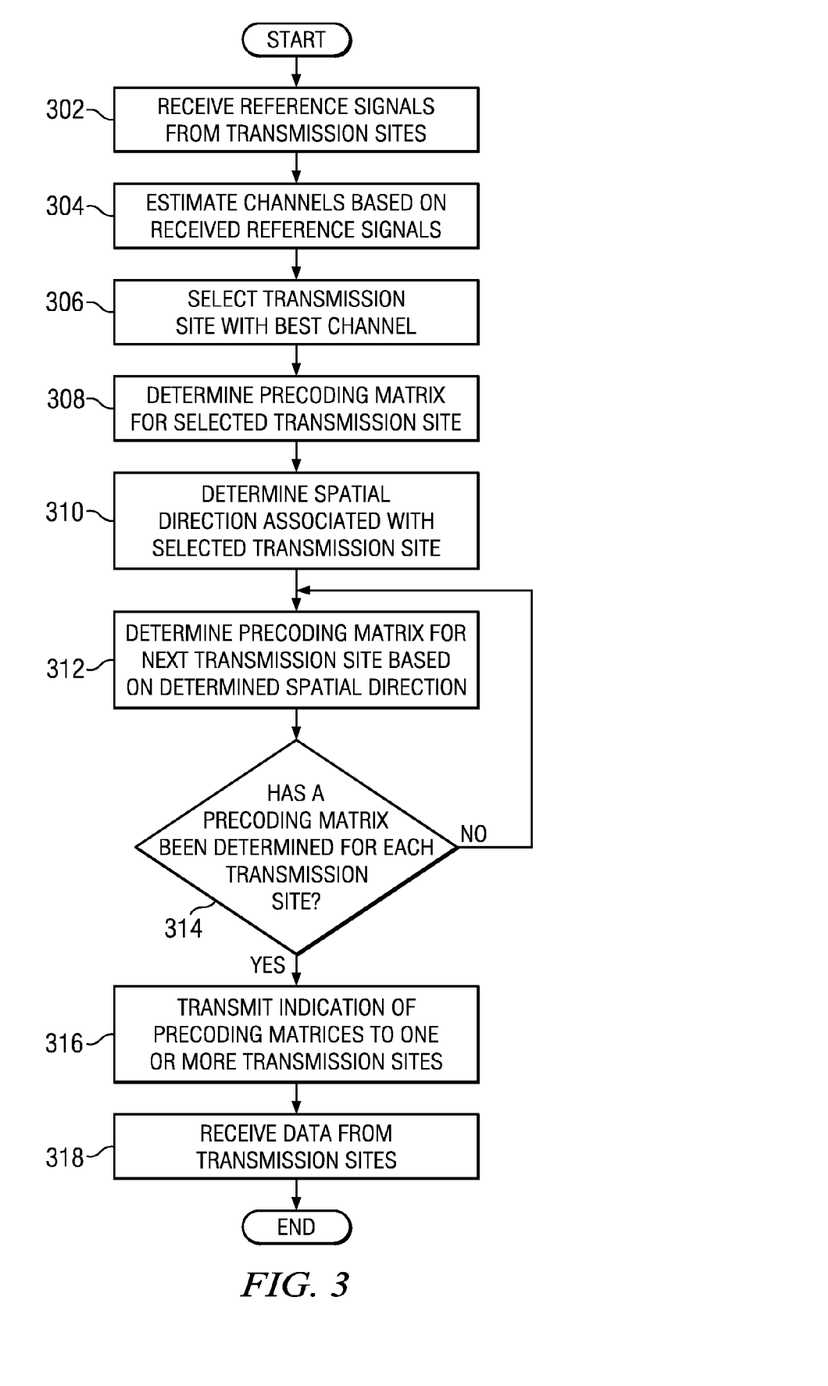
FIG. 3 depicts an example method for operating the antenna system of FIG. 1.

Embodiments and their advantages are best understood by referring to FIGS. 1-3 of the drawings, like numerals being used for like and corresponding parts of the various drawings.

FIG. 1 depicts an example antenna system 100 that performs beamforming from multiple transmission sites 108. Antenna system 100 includes transmission sites 108 that communicate with one or more endpoints 110 via antenna ports 116. Antenna system 100 provides wireless coverage for any suitable number of endpoints 110 over a geographic area, such as cell 104. For example, a transmission site 108 may be used to provide wireless coverage for an entire building, a city block, a campus, or any other area. Cell 104 may have any suitable shape, such as the honeycomb-like shape depicted in FIG. 1.

As used herein, "transmission site" may refer to a base station (also known as a Radio Element Control or a Baseband Unit) or a remote transmission site (also known as a Radio Element or a Remote Radio Head (RRH)). For example, transmission sites 108 may each be base stations. As another example, transmission site 108a may be a base station and transmission sites 108b and 108c may be remote transmission sites. In certain situations, a transmission site 108 that is a remote transmission site may function as an extension of a transmission site 108 that is a base station. For example, the remote transmission site may send wireless signals to endpoint 110 that are similar to wireless signals that would be sent by the base station to the endpoint if endpoint 110 were located close to the base station.

While some antenna systems may select a set of precoding matrices to be used by transmission sites 108 based on an estimated collective throughput through the set of channels 124, certain embodiments of the present disclosure may include selecting the best transmission site 108a, determining a precoding matrix for that transmission site, and then determining precoding matrices for one or more other transmission sites 108 based on a spatial direction of the effective channel between the best transmission site 108a and the endpoint 110. Such embodiments may significantly reduce computation complexity for the endpoint 110 and may improve the throughput of single-site multiple-input and multiple-output (MIMO) transmission.

Transmission site 108 may include any combination of hardware, software embedded in a computer readable medium, and/or encoded logic incorporated in hardware or otherwise stored (e.g., firmware) to implement any number of communication protocols that allow for wired or wireless exchange of information in antenna system 100. Transmission sites 108 may be operable to send control signals and data traffic to endpoints 110. A transmission site 108 may also be coupled to other transmission sites 108 via one or more wired connections. These wired connections may comprise any suitable material, such as optical fiber. Transmission sites 108 may use any suitable technologies or protocols (e.g., Common Public Radio Interface (CPRI)) to communicate with each other.

Transmission site 108a may communicate with endpoint 110 using wireless communication via antennas 116a and 116b. In particular embodiments, transmission site 108a coordinates with one or more other transmission sites 108 to communicate with endpoint 110. For example, transmission sites 108 may coordinate with each other to communicate with endpoint 110 using a MIMO transmission scheme where multiple transmitting antennas 116 are placed at different transmission sites 108, while one or more receiving antennas 118 are located at the endpoint 110. For example, transmission sites 108 may communicate with endpoint 110 using a downlink coordinated multi-point processing (DL CoMP) as defined in 3rd Generation Partnership Project (3GPP) Release 10 or beyond. As an example of MIMO transmission, transmission site 108a may wirelessly communicate a portion of a data stream through antennas 116a and 116b and communicate another portion of the data stream through a wired connection to one or more other transmission sites 108. The other transmission site(s) 108 then send at least a portion of the data stream to endpoint 110 via one or more wireless connections between one or more antenna ports 116 of the other transmission site(s) 108 and one or more antenna ports 118 of endpoint 110. Endpoint 110 may combine multiple signals from multiple transmission sites 108 into a single communication. Transmission sites 108 may communicate with endpoint 110 using any of a variety of different wireless technologies, including, but not limited to, orthogonal frequency division multiple access (OFDMA) and the long term evolution-advanced (LTE-A) protocol as defined in the 3GPP Release 10 or beyond.

Although not shown in the embodiment depicted, transmission sites 108 may also be coupled to any network or combination of networks capable of transmitting signals, data, and/or messages, including signals, data, or messages transmitted through WebPages, e-mail, text chat, voice over IP (VoIP), and instant messaging in order to provide services and data to endpoints 110. For example, transmission site 108a may be coupled to one or more LANs, WANs, MANs, PSTNs, WiMAX networks, global distributed networks such as the Internet, Intranet, Extranet, or any other form of wireless or wired networking. In particular embodiments, transmission site 108a also communicates with a base station controller that facilitates handoffs between cells 104 and provides other functions.

Endpoint 110 may comprise any type of wireless device able to send and receive data and/or signals to and from transmission site 108a directly and/or via one or more other transmission sites 108. Some examples of endpoints 110 include desktop computers, PDAs, cell phones, laptops, and/or VoIP phones. Endpoints 110 may provide data or network services to a user through any combination of hardware, software embedded in a computer readable medium, and/or encoded logic incorporated in hardware or otherwise stored (e.g., firmware). Endpoints 110 may also include unattended or automated systems, gateways, other intermediate components or other devices that may send or receive data and/or signals.

Various types of information may be sent to or from endpoint 110. As an example, transmission site 108 may send data traffic and control traffic to endpoint 110. Data traffic may be distinguished from control traffic that is used to setup and maintain a connection between one or more transmission sites 108 and endpoint 110. For example and not by way of limitation, data traffic may include information that transmission site 108 receives from a network coupled to the transmission site 108 (such as the Internet) or from another endpoint 110 located in the same cell 104 or a different cell. In a particular embodiment, data traffic is sent to endpoint 110 via a physical downlink shared channel (PDSCH) as defined in the LTE-A protocol. In such embodiments, demodulation reference signals (DM-RS) as defined in the LTE-A protocol may be sent from the physical antenna ports 116 of the transmission sites 108 and used to extract the relevant data traffic from the PDSCH.

Transmission sites 108 may also send control traffic to endpoint 110. In particular embodiments, these control messages are transmitted by a single transmission site 108 or jointly by multiple transmission sites 108. The control messages may include information (e.g., scheduling or demodulation information) that allows endpoint 110 to extract relevant data traffic from transmissions sent from the transmission sites 108. In particular embodiments, these control messages conform to the LTE-A standard. For example, the control messages may include cell-specific reference signals (CRS) such as primary synchronization signal (PSS), secondary synchronization signal (SSS), physical broadcast channel (PBCH), and/or physical downlink control channel (PDCCH) reference signals.

In particular embodiments, transmission sites 108 transmit control signals known as a channel reference signals 120. A channel reference signal 120 may include a sequence of values, such as a pseudo-random sequence. As an example, a channel reference signal 120 may be a channel state information reference signal (CSI-RS) as defined in LTE-A. In particular embodiments, each antenna port 116 of a particular transmission site 108 transmits the same channel reference signal (e.g., a signal with the same sequence). The antenna ports 116 of each transmission site 108 may transmit one or more channel reference signals that are distinguishable from the channel reference signals transmitted by the antenna ports 116 of each other transmission site 108. As an example, the channel reference signal 120a transmitted by transmission site 108a may be orthogonal in time, frequency, or code (OCC) domain, or any combination thereof to the channel reference signals 120b and 120c transmitted by transmission sites 108b and 108c respectively. Accordingly, endpoint 110 may be able to determine which transmission site 108 is transmitting a particular channel reference signal 124.

Endpoint 110 may analyze a received channel reference signal 120 to determine one or more characteristics of the channel (H) 124 between the transmission site 108 that sent the channel reference signal 120 and the endpoint. For example, endpoint 110 may calculate a frequency response of the channel 124 based on a received channel reference signal 120 (this may be referred to as estimating the channel). When wireless signals are sent from transmission site 108 to endpoint 110, they may take many directions (resulting in multipath fading) and may be reflected (e.g., by buildings or cars) or obstructed by objects such as trees. A channel 124 is a composite representation of the various paths that wireless signals sent from transmission site 108 to endpoint 110 may take. The channels 124 from different transmission sites 108 to endpoint 110 (e.g., $H_0$ and $H_1$) may be uncorrelated with respect to amplitude and phase, while the elements of a channel matrix (i.e., the constituent parts of the channel 124 that each correspond to a single antenna port 116 of the same transmission site 108 and a single antenna port 118 of endpoint 110) between a transmission site 108 and an endpoint 110 are usually correlated with respect to amplitude and phase.

Once a channel 124 has been analyzed (e.g., estimated), endpoint 110 may determine a precoding matrix (W) for the channel 124. In particular embodiments, the precoding matrix may be selected for the respective transmission site 108 from a predefined codebook (CBK) that includes a plurality of precoding matrices. For example, 3GPP Release 10 provides various codebooks based for various transmission schemes. The precoding matrix is applied to data sent from the respective transmission site 108 and may improve the capacity of channel 124. For example, the precoding matrix may help compensate for pathloss and/or other channel effects. The application of the precoding matrix to data transmitted from a transmission site 108 may be analogous to changing the channel characteristics. As used herein, an effective channel may be defined as the frequency response of data that is precoded (i.e., a precoding matrix is applied to the data) and then sent across a channel 124 to the endpoint. Thus, the effective channel is the product in the frequency domain of the corresponding channel (H) and the precoding matrix (W) applied to data sent through the corresponding channel.

In certain systems, when multiple transmission sites 108 transmit a data stream to an endpoint 110 (e.g., in a DL CoMP scheme), the set of precoding matrices for the transmission sites 108 is selected to optimize the aggregate capacity across all of the channels 124. However, as explained below, such an approach suffers from various drawbacks. In particular embodiments of the present disclosure, a precoding matrix is determined (e.g., selected) for a particular transmission site 108a and subsequent precoding matrices may be determined based on at least the effective channel associated with the transmission site 108a. Such embodiments may provide various advantages over existing systems and are explained herein using the following variables:

- TS represents a transmission site 108. The transmission sites 108 may be ordered in increasing order of large scale fading (e.g., due to pathloss and shadowing). For example, $TS_0$ may have the best channel 124 to endpoint 110 and thus would be the transmission site 108 used in a single-site MIMO communication scheme, $TS_1$ may have the second best channel 124, and so on.
- K represents the number of transmission sites 108 (0 to K−1) used to communicate with endpoint 110 and k represents a particular transmission site.
- M represents the number of antenna ports 116 (0 to M−1) on each transmission site 108.
- N represents the number of antenna ports 118 of an endpoint 110 and n represents a particular antenna port 118.
- $H_k$ represents the channel matrix from $TS_k$ to endpoint 110. $H_k$ may consist of entries $h^k_{ij}$ that each describe the channel from the jth antenna port 116 on $TS_k$ to the ith antenna port 118 on endpoint 110.
- X represents a transmitted symbol of length T.
- T represents the number of data layers used to transmit X
- $W_k$ represents the precoding matrix used by $TS_k$ to transmit at least a portion of symbol X to endpoint 110.
- CBK represents a codebook with an indexed finite collection of predefined precoding matrices ($W_k$).
- $S_i(A)$ represents the ith largest singular value of matrix A.

As explained above, each transmission site 108 transmits a channel reference signal 120 to endpoint 110. These channel reference signals enable the endpoint 110 to estimate the channel 124 ($H_k$) to each of the transmission sites 108. For example, if endpoint 110 knows the channel reference signal 120 that is transmitted from the respective transmission site 108, it can compare this known value to the received channel reference signal to estimate the channel $H_k$ that the channel reference signal 120 passed through.

In particular embodiments, endpoint 110 estimates a channel $H_k$ to each of a plurality of transmission sites 108 that send endpoint 110 a channel reference signal 120. The endpoint 110 may choose a precoding matrix $W_k$ for each transmission site 108, based on the estimated channels $H_k$ to all the transmission sites 108. As described above, in typical systems, the precoding matrices $W_k$ may be chosen to maximize the joint transmission capacity of channels 124 as illustrated by the following equation:

$$(W_0, W_1, \ldots, W_{K-1}) = \arg\max_{W^i \in CBK} C\left(\sum_{i=0}^{K-1} H_i W_i\right) = \arg\max_{W^i \in CBK} \sum_{t=0}^{T-1} S_i\left(\sum_{i=0}^{K-1} H_i W_i\right)$$

In certain systems, the joint selection of the K precoding matrices (one for each transmission site 108) is done through an exhaustive search. That is, the joint capacity of the K channels is analyzed for each possible combination of precoding matrices from the codebook CBW with the estimated channels 124. If B is the size of the codebook, the computation overhead may be relatively expensive, since it is on the order of $B^K$. This selection scheme generally requires $B^K$ times the computational resources required to select a precoding matrix when using single site MIMO. Another drawback of this approach is that $W_0$ (the precoding matrix for the transmission site $TS_0$ with the best channel 124) may not be optimal for single-site MIMO transmission by $TS_0$ because $W_0$ was selected to optimize the joint capacity of all the channels 124 rather than the channel $H_0$ that will be used for single-site MIMO. Accordingly, suboptimal performance may result if the transmission scheme is changed from CoMP to single-site MIMO. Computing a separate $W_0$ for single-site MIMO (in addition to the $W_0$ computed for $TS_0$ when using CoMP) may also be undesirable as it incurs additional computation and feedback overhead.

In particular embodiments of the present disclosure, endpoint 110 estimates each channel 124 to endpoint 110 and then identifies the transmission site $TS_0$ that has the best channel $H_0$ to endpoint 110. The best channel may be chosen in any suitable manner. For example, the channel 124 corresponding to the channel reference signal 124 with the highest signal strength may be chosen as $H_0$. After $H_0$ is selected, endpoint 110 determines an optimal precoding matrix $W_0$ for $TS_0$. For example, endpoint 110 may select as $W_0$ the precoding matrix that will provide the highest channel capacity through $H_0$ of any precoding matrix in the codebook CBK. To illustrate this example, the precoding matrix for transmission site 108a may be chosen according to the following equation:

$$W_0 = \arg\max_{W \in CBK} \text{Capacity}(H_0 W) = \arg\max_{W \in CBK} \sum_{i=0}^{T-1} S_i(H_0 W)$$

That is, each precoding matrix W in codebook CBK may be analyzed with respect to channel $H_0$ to determine which precoding matrix will result in the highest capacity through the channel. The combination of the channel and the precoding matrix may yield an effective channel $H_0 W_0$. After the initial precoding matrix is chosen, precoding matrices $W_k$ for each additional $TS_k$ (where each $TS_k$ is included in at least a subset of the transmission sites 108 from which channel reference signals 120 are received) are chosen such that the resulting effective channels $H_k W_k$ of the additional transmission sites 108 are rotated to the spatial direction of $H_0 W_0$. That is, the additional effective channels $H_k W_k$ will have substantially the same spatial direction as effective channel $H_0 W_0$. This may achieve spatial (matrix) coherent beamforming of transmissions from all transmission sites 108. That is, the effective channels of the transmission sites 108 may be steered such that they align with each other as opposed to destructively interfering with each other. Such embodiments may significantly reduce the amount of computational resources and feedback overhead required to determine precoding matrices as compared to typical schemes. For example, in at least some embodiments, the computation complexity for determining the precoding matrices may be on the order of K. Such embodiments may also enable high channel capacity for both single-site MIMO and CoMP transmission schemes. Accordingly, transmission sites 108 may switch between DL CoMP and traditional single-site MIMO to transmit to the endpoint 110 without a significant loss in performance.

As described above, precoding matrices $W_k$ may be chosen for the additional channels $H_k$ such that each resulting effective channel $H_k W_k$ substantially aligns with $H_0 W_0$. This may be accomplished in any suitable manner. For example, the following algorithm may be used to determine the additional precoding matrices $W_k$:

For k = 1 to K − 1
1. $A_k = H_k^{-1} H_0 W_0$,
2. $B_k = A_k (A_k^+ A_k)^{-1/2} T^{-1/2}$
3. $W_k = \arg\min_{W \in CBK}(|W - B_k|)$,
end;

where $\|\|$ is a matrix norm (e.g., a Frobenius norm, chordal distance, or other suitable matrix norm function or other measure), $A_k^+$ is the Hermitian adjoint of $A_k$, and $H_k^{-1}$ is the Moore-Penrose pseudoinverse of $H_k$. $A_k$ indicates the spatial direction of the effective channel $H_0 W_0$. $B_k$ is a normalized version of $A_k$ in order to preserve the transmission power of $TS_k$. $W_k$ may be chosen as the precoding matrix in the codebook CBK that is closest to $B_k$ according to the matrix norm function selected.

As another example of choosing precoding matrices $W_k$ for the additional channels $H_k$ such that each resulting effective channel $H_k W_k$ substantially aligns with $H_0 W_0$, the additional precoding matrices $W_k$ may be each chosen based on a composite spatial direction of the effective channels for which precoding matrices $W_k$ have already been selected. As an example, in certain embodiments, the following algorithm may be used to determine the additional precoding matrices:

For k = 1 to K − 1
1. $A_k = H_k^{-1} \sum_{i=0}^{T-1} H_i W_i$,
2. $B_k = A_k (A_k^+ A_k)^{-1/2} T^{-1/2}$
3. $W_k = \arg\min_{W \in CBK}(|W - B_k|)$,
end;

As illustrated, $A_k$ in the algorithm above indicates a spatial direction that is based on each of the effective channels $H_k W_k$ that have already been formed, rather than a spatial direction of $H_0 W_0$ alone. Such embodiments may achieve increased beamforming precision.

After determining the precoding matrices $W_k$ for transmission sites 108, endpoint 110 may communicate an indication of the selected precoding matrices to one or more of the transmission sites 108 such that the transmission sites 108 may apply the respective precoding matrices to data signals 128 sent to the endpoint 110. As an example, endpoint 110 may provide a codebook index to a transmission site 108 and the transmission site may access a codebook stored by the transmission sites 108 at the specified index to retrieve the specified precoding matrix.

After the precoding matrices have been determined and communicated to the relevant transmission sites 108, data traffic 128 may be communicated from one or more of the transmission sites 108 to endpoint 110 through antenna ports 116. This may involve applying the selected precoding matrices to a data stream and then sending the data from the transmission site 108a to the endpoint using at least one wireless connection between the endpoint 110 the transmission site 108a. In particular embodiments, transmission site 108a sends the data traffic through one or more antenna ports 116 of transmission site 108a. In other embodiments, transmission site 108a may coordinate with one or more other transmission sites 108 to wireless communicate a data stream to endpoint 110. That is, multiple transmission sites 108 may simultaneously transmit at least a portion of the data stream.

Although certain steps are described above as being performed by certain components, in general, the steps may be performed by any suitable components. For example, endpoint 110 may select the best channel or determine precoding matrices or may provide sufficient information to one or more transmission sites 108 such that the transmission sites may perform these operations. Although FIG. 1 illustrates a particular number and configuration of endpoints, connections, links, and nodes, antenna system 100 contemplates any number or arrangement of such components for communicating data. In addition, elements of antenna system 100 may include components centrally located (local) with respect to one another or distributed throughout antenna system 100.

FIG. 2 depicts example computing systems that may facilitate the operations of various components of FIG. 1. FIG. 2 includes an example antenna system 200 with two example transmission sites 108 and an example endpoint 110. Antenna system 200 may correspond to at least a portion of antenna system 100 of FIG. 1. Transmission sites 108 and endpoint 110 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of a transmission site 108 and an endpoint 110 may comprise any suitable physical form, configuration, number, type and/or layout. As an example, and not by way of limitation, transmission site 108 and/or endpoint 110 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, transmission site 108 and/or endpoint 110 may include one or more computer systems; be unitary or distributed; span multiple locations; span multiple machines; or reside in a cloud, which may include one or more cloud components in one or more networks.

In the depicted embodiment, transmission sites 108 and endpoint 110 each include their own respective processors 211, 221, and 231; memory 213, 223, and 233; storage 215, 225, and 235; interfaces 217, 227, and 237; and buses 212, 222, and 232. Although a particular antenna system is depicted having a particular number of particular components in a particular arrangement, this disclosure contemplates any suitable antenna system 200 having any suitable number of any suitable components in any suitable arrangement. For simplicity, similar components of transmission sites 108 and endpoint 110 will be discussed together while referring to the component of transmission site 108. However, it is not necessary for these devices to have the same components, or the same type of components. For example, processor 211 may be a general purpose microprocessor and processor 231 may be an application specific integrated circuit (ASIC).

Processor 211 may be a microprocessor, controller, or any other suitable computing device, resource, or combination of hardware, software and/or encoded logic operable to provide, either alone or in conjunction with other components, (e.g., memory 213) wireless networking functionality. Such functionality may include providing various wireless features discussed herein. Additional examples and functionality provided, at least in part, by processor 211 will be discussed below.

In particular embodiments, processor 211 may include hardware for executing instructions, such as those making up a computer program. As an example and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215 and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate. Memory 213 may store any suitable data or information utilized by transmission site 108, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. In particular embodiments, one or more memory management units (MMUs) may reside between processor 211 and memory 213 and facilitate accesses to memory 213 requested by processor 211.

As an example and not by way of limitation, transmission site 108 may load instructions from storage 215 or another source (such as, for example, another computer system, another base station, or a remote transmission site) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

In particular embodiments, storage 215 may include mass storage for data or instructions. As an example and not by way of limitation, storage 215 may include a hard disk drive (HDD), a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to transmission site 108, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include hardware, encoded software, or both providing one or more interfaces for communication (such as, for example, packet-based communication) between transmission sites 108, endpoints 110, any networks, any network devices, and/or any other computer systems. As an example and not by way of limitation, communication interface 217 may include a network interface controller (NIC) or network adapter for communicating with an Ethernet or other wire-based network and/or a wireless NIC (WNIC) or wireless adapter for communicating with a wireless network.

In some embodiments, interface 217 comprises one or more radios coupled to one or more antenna ports 116. In such an embodiment, interface 217 (and/or 227) receives digital data that is to be sent out to wireless devices, such as endpoints 110, via a wireless connection. The radio may convert the digital data into a radio signal having the appropriate center frequency, bandwidth parameters, and transmission power. Similarly, the radios may convert radio signals received via one or more receiving antennas into digital data to be processed by, for example, processor 211.

Depending on the embodiment, interface 217 may be any type of interface suitable for any type of network for which antenna system 200 is used. As an example and not by way of limitation, antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, antenna system 200 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Transmission site 108 may include any suitable interface 217 for any one or more of these networks, where appropriate.

In some embodiments, interface 217 may include one or more interfaces for one or more I/O devices. One or more of these I/O devices may enable communication between a person and transmission site 108. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 211 to drive one or more of these I/O devices. Interface 117 may include one or more interfaces 117, where appropriate.

Bus 212 may include any combination of hardware, software embedded in a computer readable medium, and/or encoded logic incorporated in hardware or otherwise stored (e.g., firmware) to couple components of transmission site 108 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Although FIGS. 1 and 2 have been described above as including particular components, the systems of FIGS. 1 and 2 may include any combination of any of the described components and any of the options or features described herein, as would be understood by one of ordinary skill in the art. For example, any of the options or features described herein may be utilized in combination with the illustrated embodiments of FIGS. 1 and 2 and/or any number of the other options or features also described herein as would be understood by one of ordinary skill in the art.

FIG. 3 depicts an example method 300 for operating the antenna system 100 of FIG. 1. For purposes of simplicity, the illustrated steps of method 300 are described from the perspective of an endpoint 110. The method begins at step 302 where a plurality of channel reference signals 120 are received from a plurality of transmission sites 108. At step 304, endpoint 110 estimates a channel 124 to each transmission site from which it received a channel reference signal 120. Each estimated channel may comprise a frequency domain representation of the channel 124.

At step 306, endpoint 110 selects the best estimated channel. For example, the channel 124 associated with the transmission site 108 from which the strongest channel reference signal 120 was received may be selected as the best estimated channel. If single-site MIMO transmission is used to communicate with the endpoint 110, the transmission site 108 with the best channel perform this communication.

At step 308, a precoding matrix is determined for the selected transmission site 108. In particular embodiments, a precoding matrix is selected from a codebook that is known to the endpoint 110 and the transmission sites 108. The precoding matrix may be selected to maximize the capacity of the channel 124 of the selected transmission site 108.

At step 310, a spatial direction associated with the selected transmission site 108 is determined. The spatial direction may be based on at least the estimated channel of the selected transmission site 108. In particular embodiments, the spatial direction is the spatial direction of the frequency domain product of the estimated channel and the precoding matrix determined for the selected transmission site 108.

At step 312, a precoding matrix is determined for an additional transmission site 108 based on the spatial direction determined at step 310. The precoding matrix for the additional transmission site 108 may be selected such that the effective channel formed by the estimated channel from the additional transmission site 108 and the newly selected precoding matrix has a special direction that is substantially similar to the spatial direction determined at step 310.

At step 314, it is determined whether a precoding matrix has been determined for each transmission site 108 from which a channel reference signal 124 was received (or a subset thereof). If not, step 312 is repeated until each transmission site 108 has been assigned a precoding matrix. In particular embodiments, the spatial direction determined in step 310 may be refined before the next precoding matrix is chosen. For example, if precoding matrices have been chosen for two transmission sites 108a and 108b, a spatial direction based on the effective channels associated with these transmission sites may be used at step 312 to determine the precoding matrix for a third transmission site 108c.

After the set of precoding matrices has been chosen, the method moves to step 316 where an indication of the precoding matrices is transmitted to one or more of the transmission sites 108. As an example, a set of indices corresponding to the precoding matrices may be transmitted from the endpoint 110 to one or more transmission sites 108. The transmission sites 108 will then apply their respective precoding matrices to data sent by the transmission sites. This data is received at step 318 and the method ends.

Some of the steps illustrated in FIG. 3 may be combined, modified or deleted where appropriate, and additional steps may also be added to the flowchart. Additionally, steps may be performed in any suitable order without departing from the scope of particular embodiments.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1 or 3, according to operational needs or desires.

Various embodiments of the present disclosure may provide one or more technical advantages. Technical advantages of particular embodiments include achieving beamforming gain using precoding matrices at multiple transmission sites 108. Another technical advantage may include reduced endpoint computation complexity from the order of $B^K$ to the order of K, significantly reducing both processing resources and power consumption. Another technical advantage may include selection of an optimal precoding matrix for a particular transmission site 108 for use in both CoMP and traditional single site MIMO transmission. Accordingly, a base station schedule may be given maximal flexibility in switching between the two modes. Other technical advantages will be readily apparent to one of ordinary skill in the art from the following figures, descriptions, and claims. Moreover, while specific advantages have been enumerated above, various embodiments may include all, some, or none of the enumerated advantages.

Although particular embodiments have been described in detail, it should be understood that various other changes, substitutions, and alterations may be made hereto without departing from the spirit and scope of particular embodiments. For example, although an embodiment has been described with reference to a number of elements included within transmission site 108 such as a processor, memory, storage, an interface, and a bus, these elements may be combined, rearranged or positioned in order to accommodate particular wireless architectures or needs. In addition, any of these elements may be provided as separate external components to transmission site 108 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. An endpoint comprising:
an interface configured to:
receive a channel reference signal from each transmission site of a plurality of transmission sites, each of the plurality of transmission sites comprising a transmission site of a radio antenna system;
a processor coupled to the interface and configured to:
estimate a channel to each transmission site of the plurality of transmission sites using the channel reference signal from the respective transmission site;
select a first transmission site from the plurality of transmission sites, the first transmission site comprising the site with the highest quality estimated channel of each of the plurality of transmission sites;
determine a first precoding matrix corresponding to the first transmission site, the first precoding matrix to be applied to data transmitted by the first transmission site to the endpoint; and
determine a second precoding matrix corresponding to a second channel between a second transmission site of the plurality of transmission sites and the endpoint, the second precoding matrix determined using at least a first spatial direction, the first spatial direction comprising a spatial direction of a frequency domain product of the first precoding matrix and the first channel, and wherein a frequency domain product of the second precoding matrix and the second channel rotates the second channel to the first spatial direction; and
the interface further configured to:
communicate an indication of the first precoding matrix and an indication of the second precoding matrix to a transmission site;

receive a radio transmission transmitted from the first
transmission site according to the first precoding
matrix; and
receive a radio transmission transmitted from the second
transmission site according to the second precoding
matrix.

2. The endpoint of claim 1, the processor further configured to determine a third precoding matrix for a third transmission site of the plurality of transmission sites, the third precoding matrix determined using at least the first spatial direction.

3. The endpoint of claim 1, the processor further configured to determine a third precoding matrix for a third transmission site of the plurality of transmission sites, the third precoding matrix determined at least the first spatial direction.

4. The endpoint of claim 1, the processor further configured to determine a third precoding matrix for a third transmission site of the plurality of transmission sites, the third precoding matrix determined using at least the first spatial direction and a second spatial direction comprising a spatial direction of a frequency domain product of the second precoding matrix and the second channel.

5. The endpoint of claim 1, the determining the second precoding matrix further comprising:
determining a value indicative of the first spatial direction, the value based on the frequency domain product of the first precoding matrix and the first channel;
normalizing the value; and
selecting the second precoding matrix from a plurality of precoding matrices using a comparison of the normalized value to the second precoding matrix.

6. The endpoint of claim 1, wherein the second precoding matrix is applied to data transmitted by the second transmission site to the endpoint to beamform the data transmitted by the second transmission site to the endpoint.

7. A method comprising:
receiving a channel reference signal from each transmission site of a plurality of transmission sites, each of the plurality of transmission sites comprising a transmission site of a radio antenna system;
estimating a channel to each transmission site of the plurality of transmission sites using the channel reference signal from the respective transmission site;
selecting a first transmission site from the plurality of transmission sites, the first transmission site comprising the site with the highest quality estimated channel of each of the plurality of transmission sites;
determining, by the endpoint, a first precoding matrix corresponding to the first transmission site, the first precoding matrix to be applied to data transmitted by the first transmission site to the endpoint; and
determining, by the endpoint, a second precoding matrix corresponding to a second channel between a second transmission site of the plurality of transmission sites and the endpoint, the second precoding matrix determined using at least a first spatial direction, the first spatial direction comprising a spatial direction of a frequency domain product of the first precoding matrix and the first channel, and wherein a frequency domain product of the second precoding matrix and the second channel rotates the second channel to the first spatial direction;
communicating an indication of the first precoding matrix and an indication of the second precoding matrix to a transmission site;
receiving a radio transmission transmitted from the first transmission site according to the first precoding matrix; and receiving a radio transmission transmitted from the second transmission site according to the second precoding matrix.

8. The method of claim 7, further comprising determining a third precoding matrix for a third transmission site of the plurality of transmission sites, the third precoding matrix determined using at least the first spatial direction.

9. The method of claim 7, further comprising determining a third precoding matrix for a third transmission site of the plurality of transmission sites, the third precoding matrix determined using at least the first spatial direction.

10. The method of claim 7, further comprising determining a third precoding matrix for a third transmission site of the plurality of transmission sites, the third precoding matrix determined using at least the first spatial direction and a second spatial direction comprising a spatial direction of a frequency domain product of the second precoding matrix and the second channel.

11. The method of claim 7, the determining the second precoding matrix further comprising:
determining a value indicative of the first spatial direction, the value based on the frequency domain product of the first precoding matrix and the first channel;
normalizing the value; and
selecting the second precoding matrix from a plurality of precoding matrices using a comparison of the normalized value to the second precoding matrix.

12. The method of claim 7, wherein the second precoding matrix is applied to data transmitted by the second transmission site to the endpoint to beamform the data transmitted by the second transmission site to the endpoint.

13. One or more non-transitory computer-readable storage media embodying logic that when executed by a processor is configured to:
receive a channel reference signal from each transmission site of a plurality of transmission sites, each of the plurality of transmission sites comprising a transmission site of a radio antenna system;
estimate a channel to each transmission site of the plurality of transmission sites using the channel reference signal from the respective transmission site;
select a first transmission site from the plurality of transmission sites, the first transmission site comprising the site with the highest Quality estimated channel of each of the plurality of transmission sites;
determine a first precoding matrix corresponding to the first transmission site, the first precoding matrix to be applied to data transmitted by the first transmission site to the endpoint; and
determine a second precoding matrix corresponding to a second channel between a second transmission site of the plurality of transmission sites and the endpoint, the second precoding matrix determined using at least a first spatial direction, the first spatial direction comprising a spatial direction of a frequency domain product of the first precoding matrix and the first channel, and wherein a frequency domain product of the second precoding matrix and the second channel rotates the second channel to the first spatial direction;
communicate an indication of the first precoding matrix and an indication of the second precoding matrix to a transmission site;
receive a radio transmission transmitted from the first transmission site according to the first precoding matrix; and receive a radio transmission transmitted from the second transmission site according to the second precoding matrix.

14. The media of claim 13, the logic further configured to determine a third precoding matrix for a third transmission site of the plurality of transmission sites, the third precoding matrix determined using at least the first spatial direction.

15. The media of claim 13, the logic further configured to determine a third precoding matrix for a third transmission site of the plurality of transmission sites, the third precoding matrix determined using at least the first spatial direction.

16. The media of claim 13, the logic further configured to determine a third precoding matrix for a third transmission site of the plurality of transmission sites, the third precoding matrix determined using at least the first spatial direction and a second spatial direction that is based at least on a second channel between the second transmission site and the endpoint.

17. The media of claim 13, the determining the second precoding matrix further comprising:
   determining a value indicative of the first spatial direction, the value based on the frequency domain product of the first precoding matrix and the first channel;
   normalizing the value; and
   selecting the second precoding matrix from a plurality of precoding matrices using a comparison of the normalized value to the second precoding matrix.

* * * * *